(12) United States Patent
Wang et al.

(10) Patent No.: US 12,315,098 B2
(45) Date of Patent: May 27, 2025

(54) METHOD FOR MULTI-VIEW POINT CLOUD REGISTRATION FOR WHOLE AIRCRAFT BASED ON SPHERICAL HARMONIC FEATURE (SHF)

(71) Applicant: Nanjing University of Aeronautics and Astronautics, Jiangsu Province (CN)

(72) Inventors: Jun Wang, Jiangsu Province (CN); Yuan Zhang, Jiangsu Province (CN); Hu Li, Jiangsu Province (CN); Zikuan Li, Jiangsu Province (CN)

(73) Assignee: Nanjing University of Aeronautics and Astronautics, Jiangsu Province (CN)

( * ) Notice: Subject to any disclaimer, the term of this patent is extended or adjusted under 35 U.S.C. 154(b) by 205 days.

(21) Appl. No.: 18/169,985

(22) Filed: Feb. 16, 2023

(65) Prior Publication Data
US 2023/0298296 A1    Sep. 21, 2023

(30) Foreign Application Priority Data
Mar. 17, 2022    (CN) .......................... 202210261663.3

(51) Int. Cl.
| | |
|---|---|
| G06T 19/20 | (2011.01) |
| G06T 3/08 | (2024.01) |
| G06T 5/70 | (2024.01) |
| G06T 7/64 | (2017.01) |

(52) U.S. Cl.
CPC ............... *G06T 19/20* (2013.01); *G06T 3/08* (2024.01); *G06T 5/70* (2024.01); *G06T 7/64* (2017.01); *G06T 2207/10028* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 2018/0158235 A1* | 6/2018 | Wu ......................... | G06T 19/20 |
| 2020/0096328 A1* | 3/2020 | Raab ................... | G01B 11/2522 |
| 2023/0113647 A1* | 4/2023 | Zeng ......................... | G06T 7/62 |
| | | | 345/419 |
| 2023/0194722 A1* | 6/2023 | Son ........................ | G01S 7/4808 |
| | | | 356/4.01 |

* cited by examiner

*Primary Examiner* — Tapas Mazumder

(57) ABSTRACT

The present disclosure discloses a method for multi-view point cloud registration for a whole aircraft based on a spherical harmonic feature (SHF). Gaussian sphere projection is mainly performed on a local point cloud. An SHF of each point is obtained by using a spherical harmonic transform technology. A constraint correspondence between feature points is found based on an SHF of each point in the point cloud. Multi-view point cloud data registration is performed according to an optimization graph method under a constraint of the SHF. A key of multi-view point cloud registration is to search for feature constraint relationships between different observation stations and perform nonlinear solution based on these relationships, so as to obtain a pose parameter of a point cloud in each viewing angle.

5 Claims, 8 Drawing Sheets a) On-site scanning by a scanner b) Actual acquired point cloud

Before registration

After registration

METHOD FOR MULTI-VIEW POINT CLOUD REGISTRATION FOR WHOLE AIRCRAFT BASED ON SPHERICAL HARMONIC FEATURE (SHF)

CROSS REFERENCE TO RELATED APPLICATION

This patent application claims the benefit and priority of Chinese Patent Application No. 202210261663.3, filed on Mar. 17, 2022, the disclosure of which is incorporated by reference herein in its entirety as part of the present application.

TECHNICAL FIELD

The present disclosure relates to the field of detection technologies in the aircraft industries, and in particular, to a method for multi-view point cloud registration for a whole aircraft based on a spherical harmonic feature (SHF).

BACKGROUND ART

With the development of modern aeronautics and astronautics technology, there are increasingly higher requirements for the assembly precision of an aircraft and another device. The assembly precision may directly affect acceptable quality of the aircraft, and unqualified precision may cause a serious safety risk. It is important to obtain physical parameters of a device by industrial measurement to guide an assembly process. Compared with a conventional measurement method, a measurement method for obtaining point cloud data by applying a laser radar can greatly improve measurement degree and measurement precision, and thus has a wide application prospect.

However, it is often the case that, during an aircraft assembly, information of a to-be-measured object cannot be obtained completely at one time. Instead, it is often necessary to measure and scan different locations of an aircraft in batches, cycles and levels. Therefore, it is a basic and key work to splice together point cloud data of information about these different locations and generate a unified coordinate system. Quality of point cloud registration can directly affect the measurement data result. However, in practice, due to the large volume of the point cloud data, a speed of point cloud registration may get slowed down. When registration is performed for more than two point clouds, pairwise registration is usually first performed. For example, a second point cloud registers a first point cloud, a third point cloud registers the second point cloud, and the rest is performed by analogy. In this case, a point cloud registration error can be transmitted, and consequently, precision of a last point cloud can be severely affected. In addition, when point cloud registration is performed, it is easy to fall into local optimization registration, which results in a point cloud registration failure.

SUMMARY

To-be-Solved Technical Problem

The present disclosure proposes a method for multi-view point cloud registration for a whole aircraft based on an SHF according to a pain point and a difficult point of an existing measurement technology in an aircraft assembly process by applying a laser radar. This resolves a problem of multi-view point cloud data registration for an aircraft in whole aircraft measurement.

Technical Solution

To achieve the foregoing objective, the present disclosure provides the following technical solution: A method for multi-view point cloud registration for a whole aircraft based on an SHF specifically includes the following steps:
step S1: developing a measurement solution for a whole aircraft, and performing data preprocessing after point cloud data of the whole aircraft is obtained;
step S2: calculating a preprocessed point cloud based on step S1, performing local spherical projection on each point, and calculating a local SHF based on spherical harmonic transform; and
step S3: calculating a constraint correspondence between overlapped point cloud views based on the local SHF calculated in step S2, filtering the established constraint correspondence to remove an incorrect constraint correspondence, and based on an equation of an optimization graph, resolving transformation of point clouds from different viewing angles to implement multi-view point cloud registration.

Further, the measurement solution in step S1 specifically includes deploying different viewing angles to scan the aircraft, and the point clouds from different viewing angles have overlapping degrees of 40% to 60%.

Further, data preprocessing in step S1 includes:
step S101: performing downsampling on the point cloud data, making a sampled point set be S, randomly adding one point from the point cloud to S, finding, from a remaining point, a point with a largest sum of distances from all points in S, adding the point to S, and continuously updating S until a point quantity in S reaches a specified point quantity;
step S102: performing denoising on the point cloud data, traversing all points with a given radius $r_1$ and a threshold N by using point cloud denoising based on density, calculating a point quantity in the radius $r_1$ of each point which is denoted as M, and if M<N, deleting the point, otherwise, retaining the point; and
step S103: performing coarse registration on point clouds from multiple viewing angles, and roughly estimating gesture parameters of the point clouds by manually selecting at least three points at a same location in an overlapped region from different viewing angles, to implement coarse registration of multi-view point clouds.

Further, step S2 specifically includes the following steps:
step S201: based on the point cloud data obtained in step S1, establishing a local sphere by using each point as a center of the sphere and by using $r_2$ as a radius, and constructing a Gaussian sphere feature by projecting a point in the local sphere onto a local sphere surface; and
step S202: performing spherical harmonic transform on the Gaussian sphere feature, converting the feature into a frequency domain, and resolving the feature into a form of a spherical harmonic function coefficient; and calculating energy of a spherical harmonic at different frequencies as the local SHF.

Further, step S3 specifically includes the following steps:
step S301: judging a corresponding point based on the local SHF, and determining a constraint correspondence between corresponding points in overlapped point clouds in viewing angles;

step S302: performing filtering based on curvature of the point clouds, and when a difference between curvature of a pair of initially matched feature points is less than a specified threshold, judging that the points are corresponding points; and step S303: establishing a target equation of a global optimization graph, applying local error diffusion to the entire graph, that is, evenly distributing an accumulated error to all views, and performing transformation on the point clouds based on a calculation result of the optimization graph, to implement multi-view point cloud registration, and complete splicing of point clouds of the whole aircraft.

Beneficial Effects

According to the present disclosure, when industrial detection is performed on a whole aircraft, advantages of a laser radar such as high precision and convenient operation are fully utilized. The point cloud data is measured in the aircraft assembly process. A related error parameter is obtained by splicing the point cloud data of the whole aircraft. A common problem of point cloud registration is improved, and a speed of point cloud registration is improved. It is proved that a point cloud feature description vector based on the SHF can effectively identify the corresponding points in the point cloud. In addition, point cloud registration based on the optimization graph can effectively avoid a problem that local optimum of a point cloud results in a point cloud registration failure, and further guide an assembly process to achieve a precision requirement related to aircraft assembly.

BRIEF DESCRIPTION OF THE DRAWINGS

In order to describe the technical solutions in the embodiments of the present disclosure more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

DETAILED DESCRIPTION OF THE EMBODIMENTS

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts should fall within the protection scope of the present disclosure.

Figure 1:
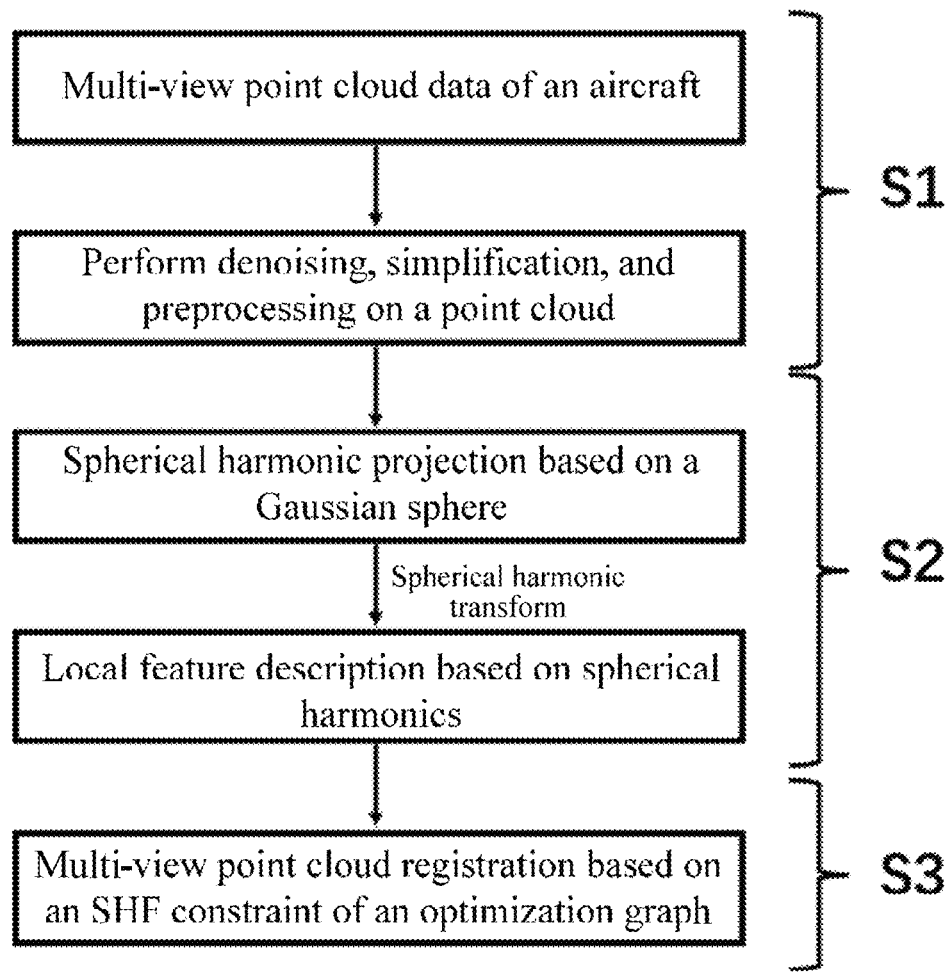
FIG. 1 is a flow chart of the present disclosure.
Figure 2A:
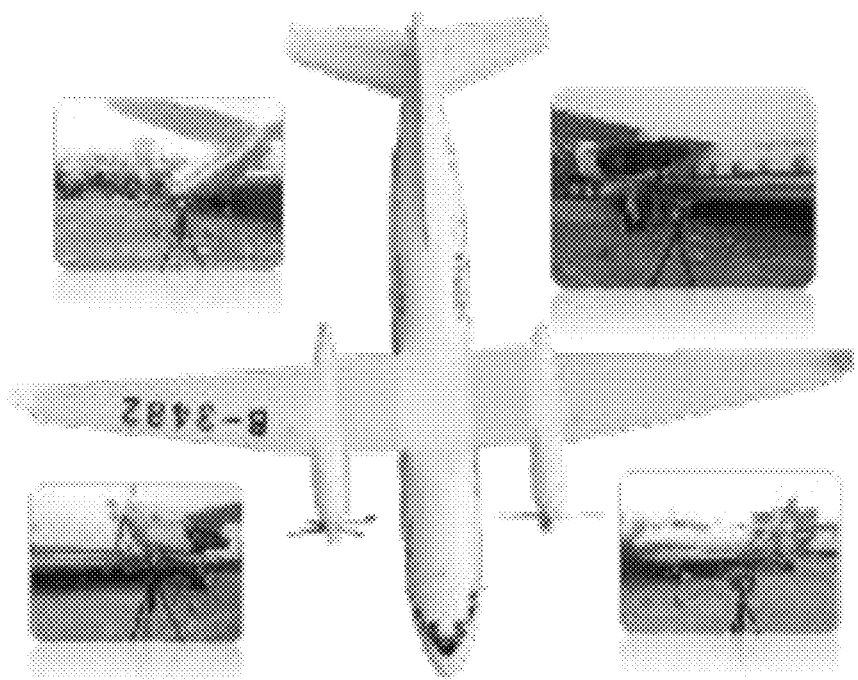
FIG. 2A and FIG. 2B are schematic diagram of a point cloud with overlapping degree obtained based on on-site deployment and measurement by a scanner based on a measurement solution according to the present disclosure.
Figure 2B:
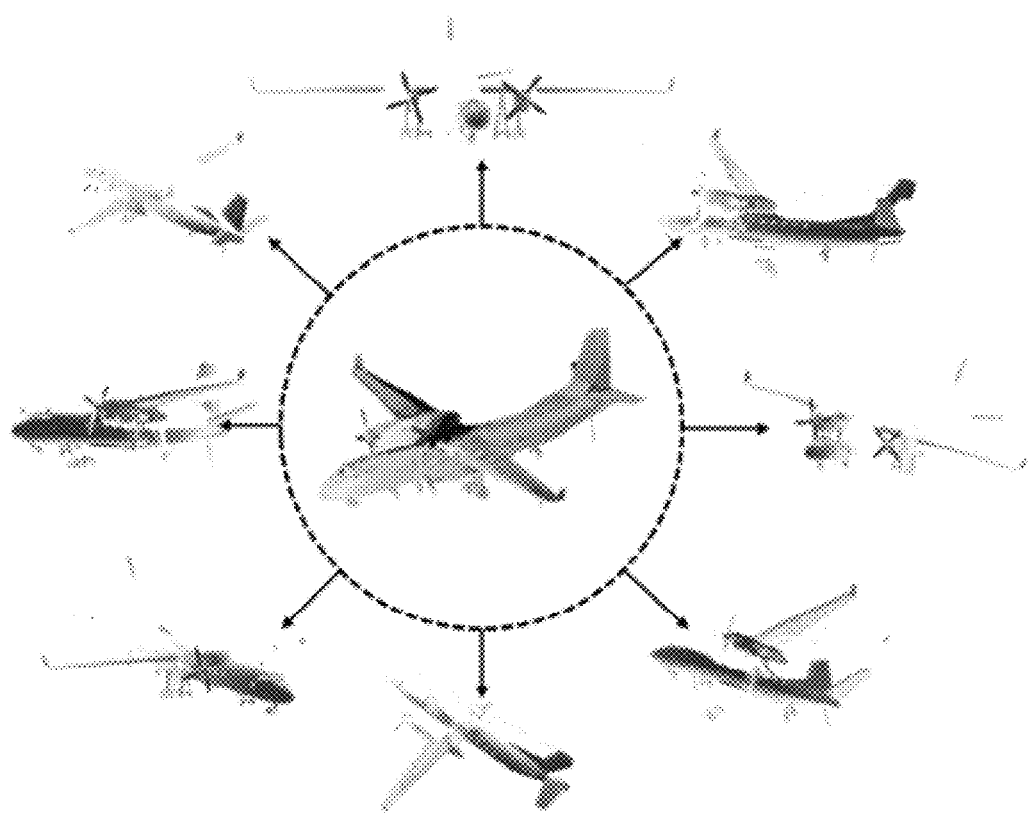

Referring to FIG. 1 to FIG. 8, as an embodiment of the present disclosure, a method for multi-view point cloud registration for a whole aircraft based on an SHF is provided. A process of the method is shown in FIG. 1 and includes the following steps:

Step S1: Develop a scanning solution, implement a measurement solution to obtain data, and perform a preprocessing operation based on an input measurement point cloud, including:

Step S101: Determine a proper scanning implementation solution, and implement the measurement solution based on a hardware device, and obtain point cloud data from different viewing angles. How to deploy different viewing angles to scan an aircraft is planned in advance. Overlapping degrees of 40% to 60% need to be set between point clouds from different viewing angles. An excessively low overlapping degree can cause difficulties in point cloud registration. An actual on-site measurement and a measurement data result are shown in FIG. 2A and FIG. 2B, respectively.

Figure 3:
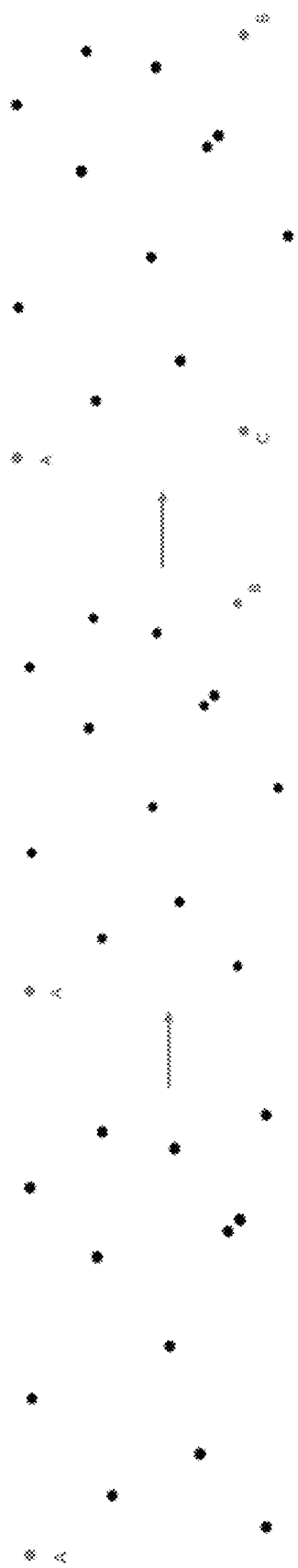
FIG. 3 is a schematic diagram of a downsampling principle according to the present disclosure.

Step S102: Perform downsampling on the data, make a sampled point set be S, randomly add one point from the point clouds to S, find, from a remaining point, a point with a largest sum of distances from all points in S, add the point to S, and continuously update S until a point quantity in S reaches a specified point quantity. As shown in FIG. 3, selected points are A, B, C, . . . , and the like.

Figure 4:
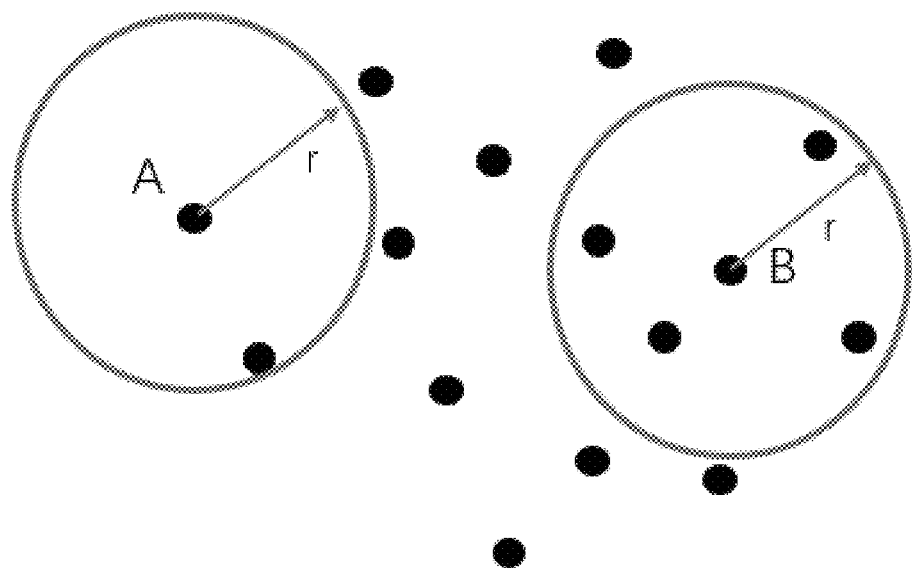
FIG. 4 is a schematic diagram of a denoising principle according to the present disclosure.

Step S103: Perform denoising based on a result of the previous step. A noise point seriously affects precision of point cloud registration. Therefore, denoising needs to be performed before point cloud registration. The point clouds is traversed with a given radius $r_1$ and a threshold N by using a selected point cloud denoising manner based on density. A point quantity M in the radius $r_1$ of each point is calculated. If M<N, the point is considered as a noise point, and the noise point is deleted. In this way, a noise point in the point clouds can be effectively removed. A denoising parameter is usually determined based on an empirical value. As shown in FIG. 4, when a radius parameter is selected as r and N=3, a point A is considered as a noise point, and a point B is retained.

Figure 5:
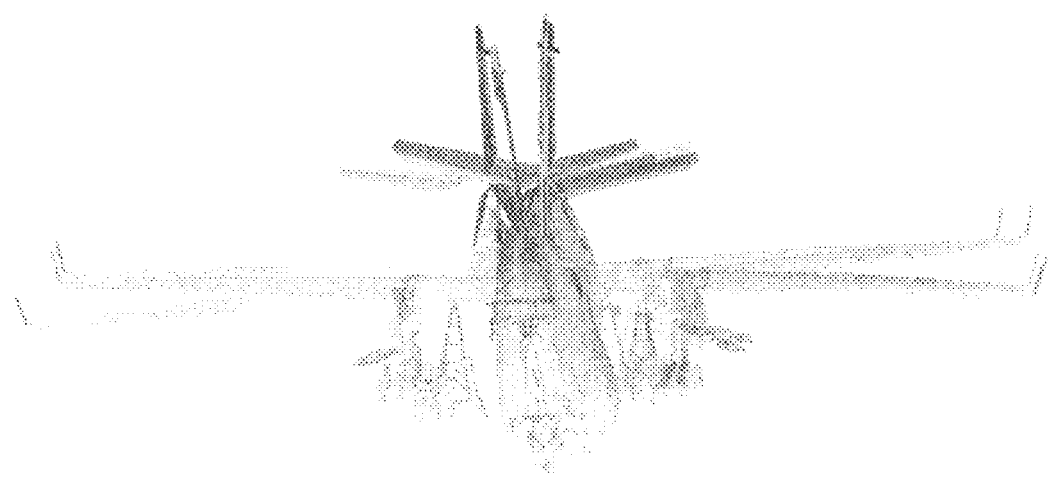
FIG. 5 is a schematic diagram of an initial registration result according to the present disclosure.

Step S104: Perform coarse registration on point clouds from multiple viewing angles, and roughly estimate gesture parameters of the point clouds by manually selecting at least three points at a same location in an overlapped region from different viewing angles. An initial registration result is shown in FIG. 5.

Step S2: Calculate a preprocessed point cloud based on step S1, perform local spherical projection on each point, and calculate a local SHF based on spherical harmonic transform.

Step S201: Establish a local sphere by using each point as a center of the sphere and by using r2 as a radius, construct a Gaussian sphere feature by projecting a point in the local sphere onto a local sphere surface, and calculate the local SHF based on spherical harmonic transform, including:

Establish a local sphere by using one point in the point clouds as a center of the sphere and by using r2 as a radius, and project all points in the local sphere onto the local sphere. A mapping equation is as follows:

$$\begin{cases} r = 1 \\ \theta = \arccos z \\ \phi = \arctan\dfrac{y}{x} \end{cases}$$

where, r represents a radial distance, $\theta$ represents a zenith angle between the local sphere and a positive z-axis, and $\phi$ represents an azimuth angle between the local sphere and a positive x-axis. A normal direction is mapped to a unit sphere.

Step S202: Describe the Gaussian sphere feature based on spherical harmonic transform. Spherical harmonic transform is performed on local information of a Gaussian sphere after projection, and the feature is resolved into a spherical harmonic function expression.

A spherical harmonic function is defined as:

$$Y_l^m(\theta, \phi) = (-1)^m \sqrt{\frac{2l+1}{4\pi} \frac{(l-m)!}{(l+m)!}} P_l^m(\cos\theta) e^{im\phi},$$

where $l=0, 1, 2, \ldots$; $m=0, \pm 1, \pm 2, \ldots, \pm l$; $(-1)^m$ is a phase angle of a normalization constant; l is referred to as a power of the spherical harmonic function; and m is referred to as an order of the spherical harmonic function.

Assuming that a band limit of a spherical function model is B, 2B×2B grid division of an equal distance in longitude and latitude directions is performed. Discrete spherical harmonic transform is performed on $f(\theta, \phi)$, and spherical harmonic coefficients in each order and each power are obtained.

$$c_l^m = \frac{\sqrt{2\pi}}{2B} \sum_{j=0}^{2B-1} \sum_{k=0}^{2B-1} f(\theta_j, \phi_k) e^{-im\phi_k} P_l^m(\cos\theta_j),$$

where $$\theta_j = \frac{\pi(2j+1)}{4B}, j = 0, 1, \ldots, 2B-1, \text{ and } \phi_k = \frac{2\pi k}{4B}, k = 0, 1, \ldots, 2B-1.$$

Any spherical function $f(\theta, \phi)$ can be resolved into a sum of harmonics of the spherical function, and a vector of the spherical harmonic function is:

$$Y_l = (T_l^l, Y_l^{l-1}, Y_l^{l-2}, \ldots, Y_l^{-l})^t$$

Rotation does not change energy of a function. The spherical function $f$ is projected onto the vector $Y_l$, a norm of the spherical function is calculated, and a rotation-invariant feature $\mu_l$ of $f$ is obtained:

$$\mu_l = \|f_l(\theta, \phi)\| = \begin{Vmatrix} <f, Y_l^l(\theta+\theta_0, \phi+\phi_0)> \\ <f, Y_l^{l-1}(\theta+\theta_0, \phi+\phi_0)> \\ <f, Y_l^{l-2}(\theta+\theta_0, \phi+\phi_0)> \\ \vdots \\ <f, Y_l^{-l}(\theta+\theta_0, \phi+\phi_0)> \end{Vmatrix} = \begin{Vmatrix} <f, Y_l^l(\theta, \phi)> \\ <f, Y_l^{l-1}(\theta, \phi)> \\ <f, Y_l^{l-2}(\theta, \phi)> \\ \vdots \\ <f, Y_l^{-l}(\theta, \phi)> \end{Vmatrix},$$

where $f_l$ is an l-order frequency component of $f$:

$$f_l(\theta,\phi) = \Sigma_{m=-l}^{l} c_l^m Y_l^m(\theta,\phi)$$

Based on a property that rotating of the spherical harmonic function do not change energy at each frequency, a descriptor of energy invariant of the spherical function is expressed as:

$$SH(f) = \{\mu_0, \mu_1, \phi_2, \ldots\}$$

Figure 6:
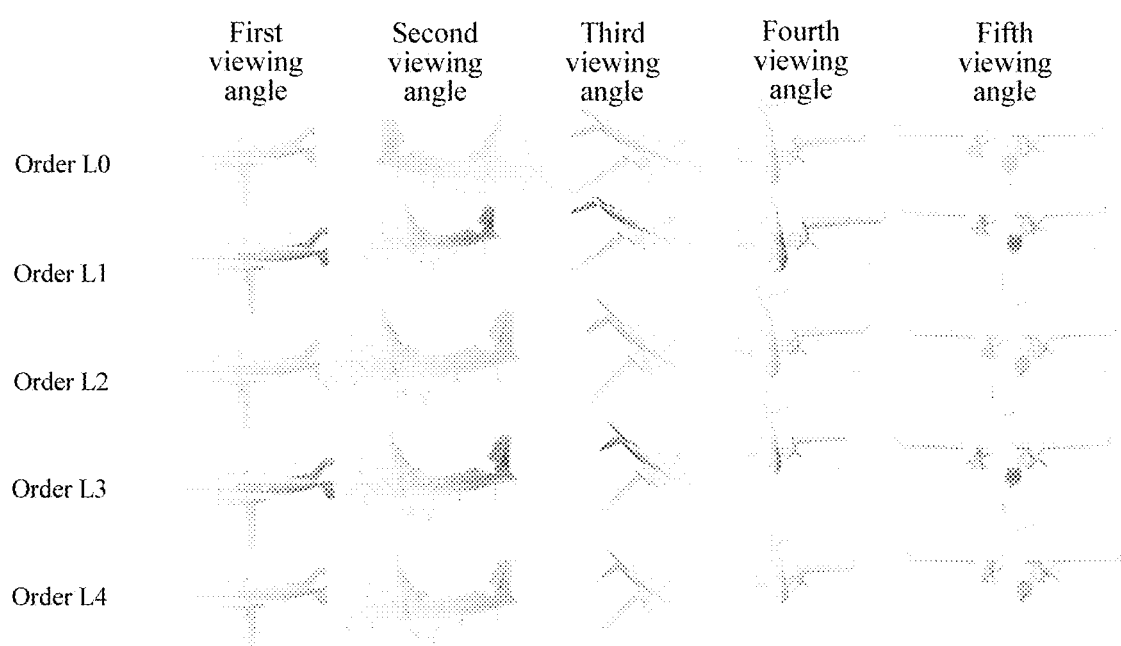
FIG. 6 is a schematic diagram of SHFs of point clouds in viewing angles according to the present disclosure.

Because these values do not change when the function is rotated, the obtained descriptor do not change either during rotation. FIG. 6 shows local SHFs in different orders of point clouds in viewing angles.

Step S3: Calculate a constraint correspondence between overlapping point cloud views based on the local SHF calculated in step S2, filter an established constraint correspondence to remove an incorrect constraint correspondence, and based on an equation of an optimization graph, resolve transformation of point clouds from different viewing angles to implement multi-view point cloud registration.

Step S301: Judge a corresponding point based on the local SHF, and determine a constraint correspondence between corresponding points in overlapped point clouds in viewing angles. A correlation degree of two feature points is reflected by using a Pearson correlation coefficient. A correlation coefficient t is:

$$t = \frac{\sum_{i=1}^{n}(X_i - \overline{X})(Y_i - \overline{Y})}{\sqrt{\sum_{i=1}^{n}(X_i - \overline{X})^2}\sqrt{\sum_{i=1}^{n}(Y_i - \overline{Y})^2}} = \frac{Cov(X, Y)}{\sigma_X \sigma_Y},$$

where

N is a quantity of SHFs, and t describes a degree of linear correlation between two vectors. A value range of t is [−1, 1]. If t>0, it indicates that the two vectors are positively correlated. If t<0, it indicates that the two vectors are negatively correlated. If t=0, it indicates that two variables are not linear correlation. A threshold $\varepsilon$ is set. When t>$\varepsilon$, two points are considered as corresponding points.

Step S302: Filter, based on curvature of the point cloud, the corresponding point judged based on the SHF. For initially matched feature point pairs, corresponding points in the point cloud should have similar geometric features. Thus, curvature between the corresponding points should be close to each other. Therefore, the correspondence is further screened based on whether curvature between the initially matched points is close to each other. When a difference between the curvature of the corresponding points is less than a given threshold, it is considered that a test of the corresponding point is passed.

$$\|\kappa_1 - \kappa_2\| < 0.1, \text{ where}$$

$\kappa_1$ and $\kappa_2$ separately are the curvature of the corresponding points in the point cloud.

Step S303: Perform global registration and splicing on the multi-view point cloud based on the constraint correspondence that is based on the points and that is screened in S301 and S302, to measure the whole aircraft. A global optimization graph is established based on actual distribution of the point clouds in viewing angles. A target equation of the optimization graph is as follows:

$$\min_{\hat{\theta}} \sum_{t=1}^{N} \sum_{i=1}^{M} \left( \|\hat{\theta}_i(x_i^t) - \overline{x}_i^t\|^2 + \|\hat{\theta}_i^{-1}(y_i^t) - \overline{y}_i^t\|^2 \right),$$

s.t. $\hat{\theta}_1 \cdot \hat{\theta}_2 \ldots \hat{\theta}_N = I$ where N is a quantity of point cloud views with an overlapping relationship; M is a quantity of corresponding points in a $t^{th}$ pair of point cloud views overlapped with each other; $x_i$ and $y_i$ are homogeneous coordinates of a point cloud in an overlapped region; and $\hat{\theta}_1 . \hat{\theta}_1 \ldots \hat{\theta}_N$ is a 4×4 rigid body transformation matrix of point cloud views forming a closed loop. The target equation aims to minimize a distance between each pair of point clouds with an overlapping viewing angle after transformation. This minimizes a registration error and a transformation error of multi-view registration while ensuring registration consistency. A hierarchical approach for multi-view rigid registration is used. A multi-view registration problem is resolved by hierarchical optimization defined on an undirected graph. Each node or edge in the graph respectively represents a connection of one view or two overlapping views. Optimization is hierarchically performed on an edge, a loop, and the entire graph. In addition, a weight relationship of an overlapping degree between the views is considered. The overlapping degree between the views is calculated, and a view with a higher overlapping degree should be assigned a higher weight. First, each pair of overlapping views are locally aligned. A size of an overlapped region in each overlapping view pair after initial pairwise alignment is calculated, and this value is set to a weight of an edge. Next, a loop-based incremental registration algorithm is introduced to improve initial pairwise alignment. After loop registration, a view in a loop is combined into a meta view in the graph. Finally, local error diffusion is applied to the entire graph, to evenly distribute accumulated errors to rigid body transformation in all viewing angles. Based on a point cloud registration result calculated based on the optimization graph, transformation is performed on the point cloud, to complete point cloud registration. In addition, a precision standard deviation of point cloud registration is output, a measurement report of the whole aircraft is output, and measurement and splicing of the whole aircraft are completed.

Figure 7:
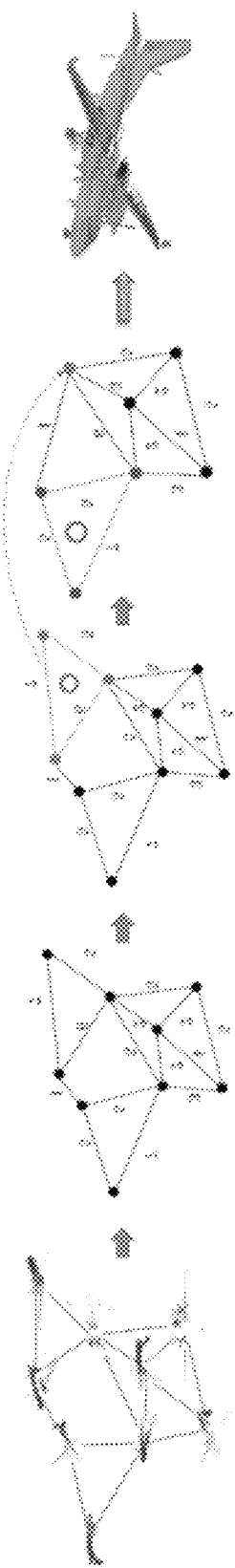
FIG. 7 is a schematic diagram of a graph-based global optimization procedure of point cloud registration according to the present disclosure.

A graph-based global optimization process is shown in FIG. 7.

Figure 8:
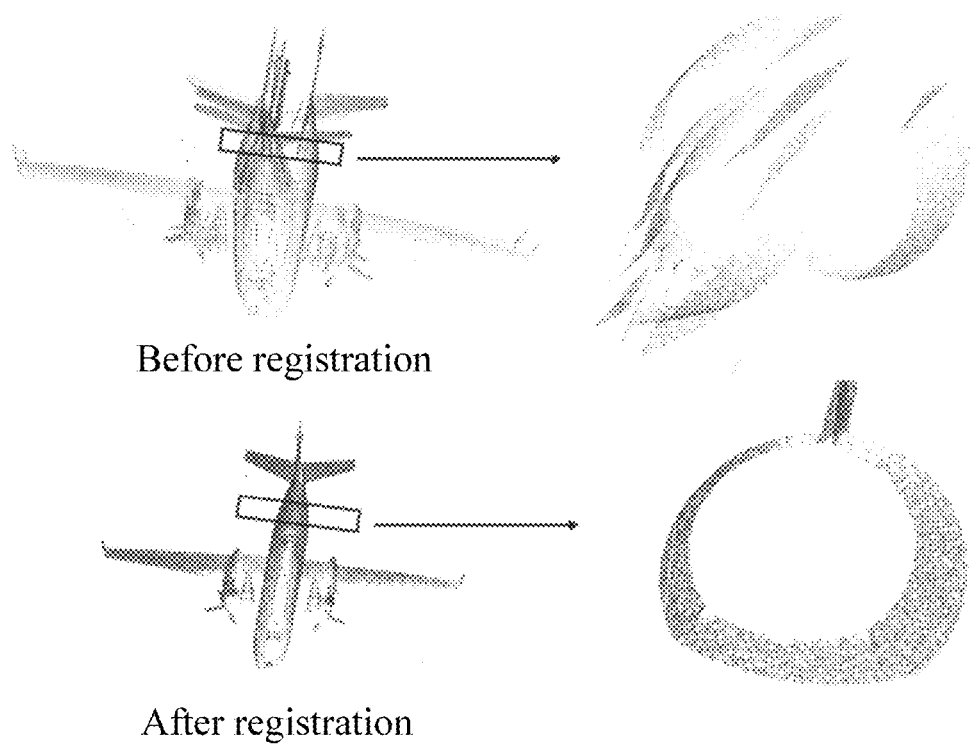
FIG. 8 is a schematic diagram of a registration result based on an optimization graph according to a diagram of the present disclosure.

A globally optimized point cloud is shown in FIG. 8.

Various aspects of the present disclosure are described with reference to the drawings, in which many embodiments of the present disclosure are shown. However, the embodiments of the present disclosure are not necessarily defined to include all aspects of the present disclosure. It should be understood that the various concepts and embodiments introduced above and the concepts and implementations described in more detail below may be implemented in any of many ways. Therefore, the concepts and embodiments of the present disclosure are not limited to any implementation. In addition, some aspects of the present disclosure may be used alone or in any appropriate combination with other aspects of the present disclosure.

The preferred embodiments of the present disclosure disclosed above are only used to help illustrate the present disclosure. The preferred embodiments neither describe all the details in detail, nor limit the present disclosure to the specific embodiments described. Obviously, many modifications and changes may be made based on content of this description. The description selects and specifically describes these embodiments, in order to better explain the principle and practical application of the present disclosure, so that a person skilled in the art can well understand and use the present disclosure. The present disclosure is limited by the appended claims and all scope and equivalents thereof.

What is claimed is:

1. A method for multi-view point cloud registration for a whole aircraft based on a spherical harmonic feature (SHF), specifically comprising the following steps:
    step S1: developing a measurement solution for a whole aircraft, and performing data preprocessing after point cloud data of the whole aircraft is obtained;
    step S2: calculating a preprocessed point cloud based on step S1, performing local spherical projection on each point, and calculating a local SHF based on spherical harmonic transform; and
    step S3: calculating a constraint correspondence between overlapping point cloud views based on the local SHF calculated in step S2, filtering the established constraint correspondence to remove an incorrect constraint correspondence, and based on an equation of an optimization graph, resolving transformation of point clouds from different viewing angles to implement multi-view point cloud registration.

2. The method for multi-view point cloud registration for a whole aircraft based on an SHF according to claim 1, wherein the measurement solution in step S1 specifically comprises deploying different viewing angles to scan the aircraft, and there are overlapping degrees of 40% to 60% between the point clouds from different viewing angles.

3. The method for multi-view point cloud registration for a whole aircraft based on an SHF according to claim 1, wherein data preprocessing in step S1 comprises:
    step S101: performing downsampling on the point cloud data, making a sampled point set be S, randomly adding one point from the point clouds to S, finding, from a remaining point, a point with a largest sum of distances from all points in S, adding the point to S, and continuously updating S until a point quantity in S reaches a specified point quantity;
    step S102: performing denoising on the point cloud data, traversing all points with a given radius r1 and a threshold N by using point cloud denoising based on density, calculating a point quantity in the radius r1 of each point which is denoted as M, and if M<N, deleting the point, otherwise, retaining the point; and
    step S103: performing coarse registration on point clouds from multiple viewing angles, and roughly estimating gesture parameters of the point clouds by manually selecting at least three points at a same location in an overlapped region from different viewing angles, to implement coarse registration of multi-view point clouds.

4. The method for multi-view point cloud registration for a whole aircraft based on an SHF according to claim 1, wherein step S2 specifically comprises the following steps:
    step S201: based on the point cloud data obtained in step S1, establishing a local sphere by using each point as a center of the sphere and by using r2 as a radius, and constructing a Gaussian sphere feature by projecting a point in the local sphere onto a local sphere surface; and
    step S202: performing spherical harmonic transform on the Gaussian sphere feature, converting the feature into a frequency domain, and resolving the feature into a form of a spherical harmonic function coefficient; and calculating energy of a spherical harmonic at different frequencies as the local SHF.

5. The method for multi-view point cloud registration for a whole aircraft based on an SHF according to claim 1, wherein step S3 specifically comprises the following steps:
    step S301: judging a corresponding point based on the local SHF, and determining a constraint correspondence between corresponding points in overlapped point clouds in viewing angles;

step S302: performing filtering based on curvature of the point clouds, and when a difference between curvature of a pair of initially matched feature points is less than a specified threshold, judging that the points are corresponding points; and step S303: establishing a target equation of a global optimization graph, applying local error diffusion to the entire graph, that is, evenly distributing an accumulated error to all views, and performing transformation on the point clouds based on a calculation result of the optimization graph, to implement multi-view point cloud registration, and complete splicing of point clouds of the whole aircraft.

* * * * *